C. ENDERS.
MOWING MACHINE.
APPLICATION FILED MAR. 10, 1915.
1,182,899.
Patented May 16, 1916.
2 SHEETS—SHEET 1.
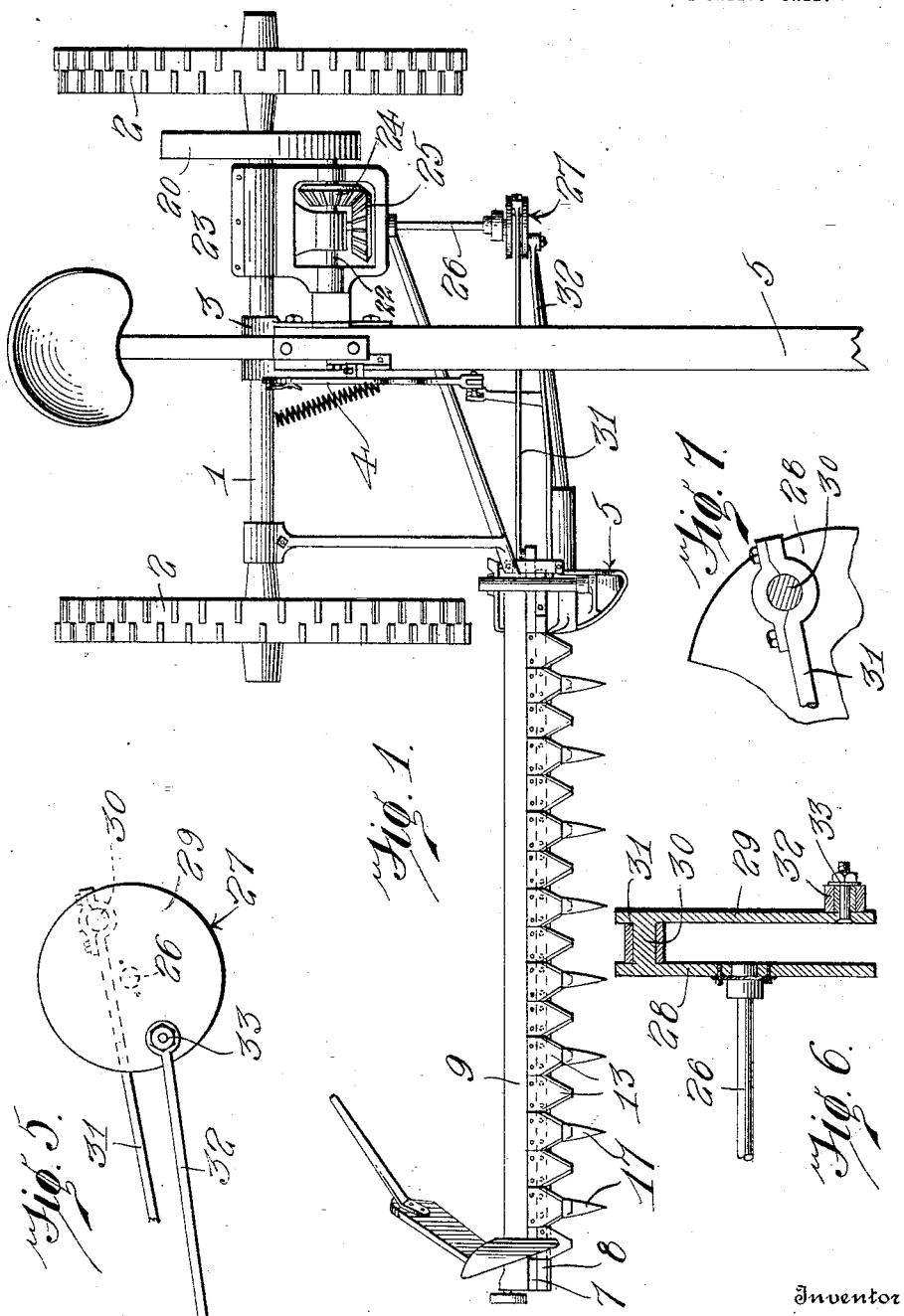
Witnesses
C. P. Hardy
Wm E Valk Jr.
Inventor
Cornelius Enders
By Richard Bowen,
Attorney

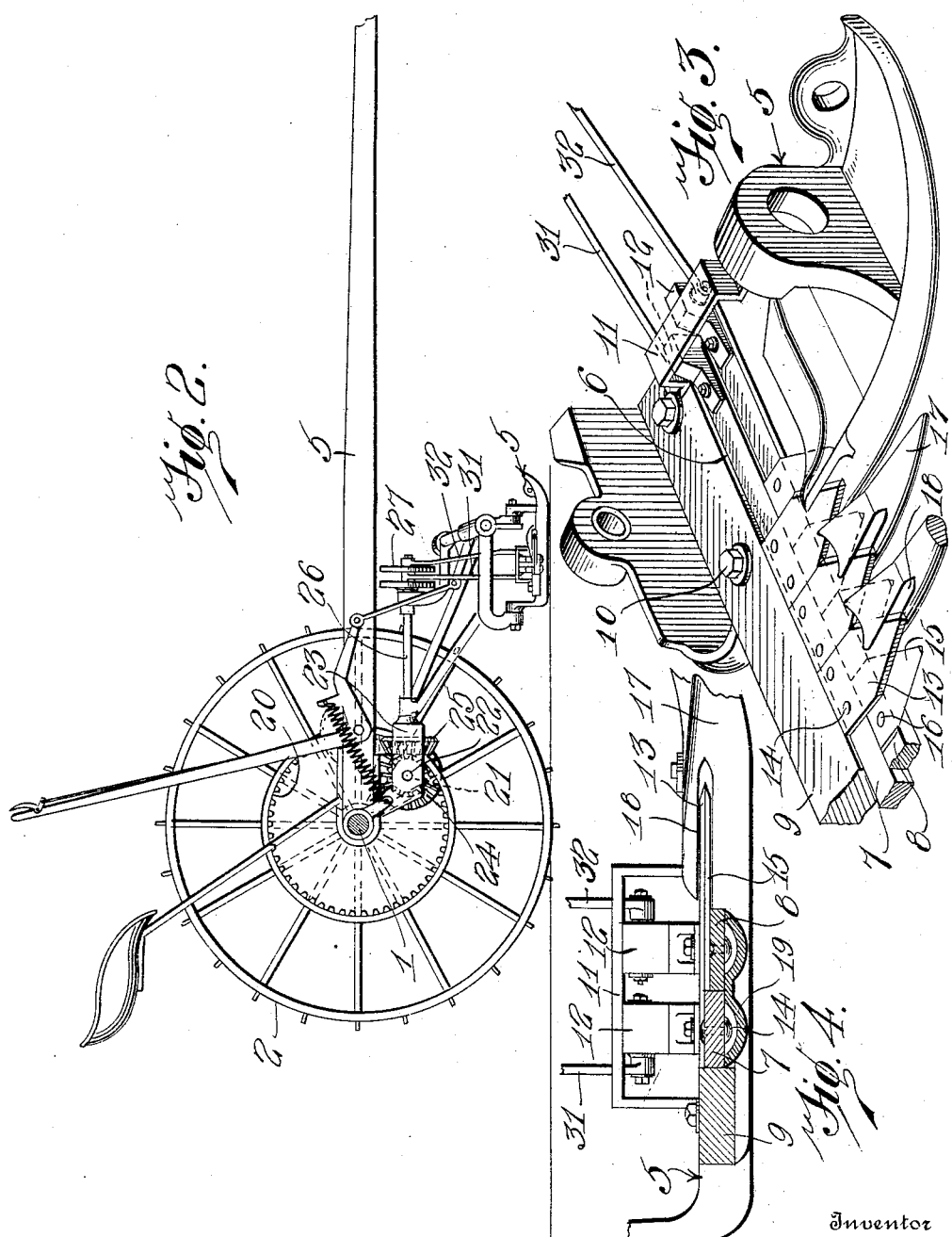

UNITED STATES PATENT OFFICE.

CORNELIUS ENDERS, OF HALIFAX, PENNSYLVANIA.

MOWING-MACHINE.

1,182,899.   Specification of Letters Patent.   Patented May 16, 1916.

Application filed March 10, 1915. Serial No. 13,411.

*To all whom it may concern:*

Be it known that I, CORNELIUS ENDERS, citizen of the United States, residing at Halifax, in the county of Dauphin and State of Pennsylvania, have invented certain new and useful Improvements in Mowing-Machines, of which the following is a specification.

This invention has reference to improvements in harvesting machines and more particularly to machines designed for reaping or mowing grasses and grains.

The cutting mechanism may be said to constitute the novelty here involved. The coöperating blades or shares are oppositely beveled and adapted for alternating reciprocatory movement, the flat faces of the respective blades being disposed in engaging proximity to positively and effectually cut or sever all grass or grain brought into contact therewith.

Particular stress is laid upon the novel and peculiar manner in which the blades or shares are beveled, the relative arrangement and movement of the blades precluding ready admission of foreign substances therebetween and facilitating greatly the cutting action by reason of the shearing effect produced. I also aim to produce improved and simplified actuating mechanism for alternately or transversely reciprocating the cutting blades. I further contemplate an improved support or runway for the blades.

The invention will be best understood from a consideration of the following details of description taken in connection with the accompanying drawings forming a part of this specification, with the understanding, however, that the invention in its practical embodiment is not limited to the exact arrangement or construction of parts shown in the drawings and hereinafter described, so long as such practical embodiment shall have incorporated therein the salient features of the present invention.

In the drawings: Figure 1 is a plan view of a mower equipped with the present invention; Fig. 2 is a side elevation of the mower, one of the wheels of the machine having been removed; Fig. 3 is a detail perspective view of the supporting shoe for the cutting mechanism, the arrangement of the cutting blades being clearly shown; Fig. 4 is a fragmentary view in cross section of the mechanism shown in Fig. 3; Fig. 5 is a fragmentary side elevation of the operating eccentric; Fig. 6 is a cross section of the eccentric as shown in Fig. 5; and Fig. 7 is an enlarged fragmentary view illustrating the connection between one of the pitman rods and the said eccentric.

Referring now to the drawings, there is shown an axle 1 carrying wheels 2—2 such as are commonly employed in machines of this character and consequently no specific description is needed of these features. Intermediate of the axle there is mounted a sleeve 3 on which is formed or to which is secured a yoke having spaced legs or extensions 4 receiving between them a tongue or pole 5 such as is commonly employed in mowing machines. This tongue may be provided with suitable draft appliances (not shown) in a manner common to the art.

Situated forwardly of the axle 1 and adjustable vertically through the agency of any suitable adjusting means I provide a shoe structure 5, the said shoe structure being provided with a transverse groove 6 within which the alternately or transversely reciprocating blade supports 7 and 8 or bars fit, the said shoe 5 also creating a support for the cutter frame 9 which may be bolted thereto as indicated at 10.

A suitable bracket 11 is mounted on the shoe structure to span the transverse groove 6 and to afford a guide for the cutter bars 7 and 8, each bar being equipped with a guide block 12 at the shoe end of the cutter frame, said guide blocks having connection with the driving mechanism as will hereinafter appear. The respective blocks 12 engage the under side of the bracket 11 and preclude vertical displacement of the said cutter bars.

Particular attention is called to the fact that the cutter bars are of a size to be arranged in step like relation in cross section, such construction permitting the presentation of a perfectly smooth upper face and precluding the retention of foreign substances upon the top of the cutter frame during the advancement of the machine. Blades 13 are fastened as at 14 to the cutter bar 7, the under horizontally flat surface of the several blades engaging the top horizontally flat surface of like blades 15 fastened as at 16 to the cutter bar 8, the thickness of the last mentioned blades being equal to the depth of the space between the top face of cutter bar 8 and the top face of bar 7, while the thickness of the blades 13 is equal to the depth of the space between the cutter bar 7 and the top face of the cutter frame 9. Blades 13 are somewhat elongated whereby to terminate forwardly of the cutter frame upon the same plane as the forward terminal of the several blades 15. The blades 15 are oppositely beveled to the blades 13 to in this manner increase the shearing action during alternate reciprocatory movement of the cutter bars. The bevel formation of the blades 15 will also serve as a means preventing admission of foreign or extraneous substances from lodging between the cutting edges of the coacting blades.

Guard members 17 may be fastened in any suitable manner to the cutter frame to project forwardly thereof, each guard member being longitudinally split as indicated at 18 to create a working space within which the several blades operate, the overlapping upper portion of the split guards extending rearwardly or toward the cutter frame to a point approximately in line with the forward longitudinal edge of the cutter bar 8.

Heretofore it has been customary to equip the guard members with a metallic cutting edge for coöperation with a single reciprocatory or movable share or blade. This construction and arrangement has proven objectionable in that extraneous substances will under ordinary circumstances lodge between the blades and the guards, consequently chipping one or the other and detracting materially from the usefulness and operativeness of the machine. It is to overcome this very objectionable feature that the present invention is designed, the alternating reciprocatory blades precluding the lodgment of the foreign substances and adding materially to the shearing action desired in the attainment of a positive cut.

As a support for the cutter bars 7 and 8, a longitudinally dished support member 19 is arranged therebeneath, the said support member affording a working space for the retaining or fastening means indicated at 14 and 16, the said support extending longitudinally of the cutter frame throughout its length.

Passing on to a detail description of the actuating mechanism employed to reciprocate the cutter bars, 20 designates an internally toothed gear mounted for turning movement upon the axle 1 of the machine. Said gear is in mesh with a pinion 21 which, as shown to advantage in Figs. 1 and 2 is mounted on a shaft 22 journaled at its respective ends in a bracket 23 supported from the axle preferably in a plane below that of the tongue 5. Shaft 22 also mounts a bevel gear 24 which is adapted for meshing engagement with a like gear 25 mounted on an operating shaft 26 extending forwardly of the machine, said shaft terminating in what may be termed a double eccentric structure designated as an entirety by the numeral 27. The double eccentric structure in its preferred embodiment consists of a first disk 28 and a second disk 29, the said two disks being arranged in spaced but alined relation and connected by an integral joint member 30, said member being situated at a point adjacent the periphery of the eccentric device. One end of a pitman rod 31 has detachable connection with joint member 30 whereby to reciprocate cutter bar 8 during rotary or turning movement of the eccentric. To provide for alternating or transversely reciprocating movement of the cutter bar 8, said bar is connected to the eccentric device at a point diametrically opposite to that of the bar 31, a pitman rod 32 being utilized as the connecting medium. The point of connection is indicated at 33 and is best shown in Figs. 5 and 6 of the drawings.

From the foregoing, taken in connection with the accompanying drawings it is evident that the entire cutter frame may be raised out of engagement with the ground when it is so desired; that the reciprocatory blades are driven directly through the tractive efforts of the draft applied to the machine; and that the said blades are at all times reciprocated transversely or alternatingly through the novel arrangement of the pitman rods 31 and 32 with respect to the double eccentric noted above.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus fully described my invention, what I claim as new and desire to secure by Letters Patent, is:—

In a mowing machine the combination with a cutter frame, cutter bars, bolts secured to the top face of the said cutter bars, a shoe rigid with the cutter frame, of an inverted substantially U-shaped bracket mounted on said shoe, a friction block secured to each cutter bar for engagement with the under side of said bracket to preclude vertical displacement of said cutter bars and means to alternately reciprocate the cutter bars.

In testimony whereof I affix my signature in presence of two witnesses.

CORNELIUS ENDERS.

Witnesses:
JOHN METZGER,
WILLIAM S. B. GRAY.

Copies of this patent may be obtained for five cents each, by addressing the "Commissioner of Patents, Washington, D. C."